(12) United States Patent
Kikuchi

(10) Patent No.: US 8,934,759 B2
(45) Date of Patent: Jan. 13, 2015

(54) VIDEO EDITING APPARATUS AND VIDEO EDITING METHOD

(75) Inventor: Toru Kikuchi, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 13/092,025

(22) Filed: Apr. 21, 2011

(65) Prior Publication Data

US 2011/0268426 A1 Nov. 3, 2011

(30) Foreign Application Priority Data

Apr. 28, 2010 (JP) ................................. 2010-104185

(51) Int. Cl.
| | |
|---|---|
| G11B 27/00 | (2006.01) |
| H04N 5/93 | (2006.01) |
| H04N 9/80 | (2006.01) |
| H04N 9/82 | (2006.01) |
| G11B 27/034 | (2006.01) |
| G11B 27/28 | (2006.01) |

(52) U.S. Cl.
CPC ............ *H04N 9/8205* (2013.01); *G11B 27/034* (2013.01); *G11B 27/28* (2013.01)
USPC ........... 386/278; 386/239; 386/241; 386/242; 386/248

(58) Field of Classification Search
USPC .................................. 386/239–260, 278–290
See application file for complete search history.

(56) References Cited

U.S. PATENT DOCUMENTS

| | | | | |
|---|---|---|---|---|
| 8,538,044 | B2 * | 9/2013 | Tsukizawa et al. ............ | 381/117 |
| 2003/0223006 | A1 * | 12/2003 | Kito .......................... | 348/333.03 |
| 2007/0237360 | A1 * | 10/2007 | Irie et al. ...................... | 382/103 |
| 2007/0286579 | A1 * | 12/2007 | Murabayashi et al. ......... | 386/96 |
| 2007/0297687 | A1 * | 12/2007 | Yamasaki ...................... | 382/255 |
| 2008/0019661 | A1 * | 1/2008 | Obrador et al. .................. | 386/52 |
| 2008/0123966 | A1 | 5/2008 | Nishida | |
| 2009/0052734 | A1 | 2/2009 | Hosaka | |
| 2009/0060291 | A1 * | 3/2009 | Ohtani et al. .................. | 382/118 |
| 2009/0147992 | A1 * | 6/2009 | Tong et al. .................... | 382/103 |
| 2009/0327334 | A1 * | 12/2009 | Rodriguez et al. ............ | 707/102 |
| 2010/0054691 | A1 * | 3/2010 | Takayama et al. .............. | 386/52 |

FOREIGN PATENT DOCUMENTS

| | | |
|---|---|---|
| JP | 09-149318 A | 6/1997 |
| JP | 2000-187737 A | 7/2000 |
| JP | 2006-139382 A | 6/2006 |
| JP | 2007-082091 A | 3/2007 |
| JP | 2007-184869 A | 7/2007 |
| JP | 2007-266838 A | 10/2007 |

* cited by examiner

*Primary Examiner* — Hung Dang
(74) *Attorney, Agent, or Firm* — Canon USA, Inc., IP Division

(57) ABSTRACT

A video editing apparatus capable of generating edited video data includes a video data selection unit configured to select a plurality of pieces of video data based on a set selection condition, an estimation unit configured to estimate correlation between video frames of the plurality of pieces of the video data selected by the video data selection unit, a cut-point setting unit configured to set the video frames estimated with a predetermined high correlation by the estimation unit as a cut-point, if the plurality of pieces of the video data selected by the video data selection unit are connected, and a generation unit configured to connect the plurality of pieces of the video data selected by the video data selection unit based on the cut-point set by the cut-point setting unit, and generate the edited video data.

7 Claims, 11 Drawing Sheets

FIG.3

| CUT ID | SELECTION CONDITION |
|---|---|
| 1 | FACE SIZE = SMALL, AND NUMBER OF PERSONS = LARGE |
| 2 | FACE SIZE = MEDIUM, AND NUMBER OF PERSONS = SMALL |
| 3 | FACE SIZE = LARGE, AND NUMBER OF PERSONS = 1 |
| ⋮ | ⋮ |

| VIDEO DATA NAME | FACE SIZE | NUMBER OF PERSONS | USER ADDITION INFORMATION |
|---|---|---|---|
| video_1.mpg | SMALL | LARGE | NULL |
| video_2.mpg | MEDIUM | SMALL | NULL |
| video_3.mpg | LARGE | 1 | NULL |
| video_4.mpg | NULL | NULL | PLANE, OVERHEAD, BLUE SKY |
| ⋮ | ⋮ | ⋮ | ⋮ |

| CUT ID | VIDEO DATA NAME |
|---|---|
| 1 | video_1.mpg |
| 2 | video_2.mpg |
| 3 | video_3.mpg |
| ⋮ | ⋮ |

| CUT ID | VIDEO DATA NAME | IN POINT | OUT POINT |
|---|---|---|---|
| 1 | video_1.mpg | 0:00:00.00 | 0:00:48.00 |
| 2 | video_2.mpg | 0:00:03.13 | 0:00:24.30 |
| 3 | video_3.mpg | 0:00:02.06 | 0:00:38.13 |
| ⋮ | ⋮ | ⋮ | ⋮ |

FIG.6

| PRECEDING VIDEO DATA NAME | FOLLOWING VIDEO DATA NAME | CUT-POINT OF PRECEDING VIDEO DATA | CUT-POINT OF FOLLOWING VIDEO DATA |
|---|---|---|---|
| video_1.mpg | video_2.mpg | 0:00:48.00 | 0:00:03.13 |
| video_1.mpg | video_2.mpg | 0:00:47.66 | 0:00:04.03 |
| video_2.mpg | video_3.mpg | 0:00:24.30 | 0:00:02.06 |
| video_3.mpg | video_4.mpg | 0:00:38.13 | 0:00:05.26 |
| ⋮ | ⋮ | ⋮ | ⋮ |

VIDEO EDITING APPARATUS AND VIDEO EDITING METHOD

BACKGROUND OF THE INVENTION

1. Field of the Invention

The present invention relates to generation of edited video data obtained by connecting a plurality of pieces of video data.

2. Description of the Related Art

Recently, a moving image capturing function is provided for various devices such as a digital video camera, a digital camera, a digital single lens reflex camera, a mobile phone, a personal digital assistant, and a portable music player. An increase in capacity advances in a data storage medium such as a hard disk drive or a memory card, and the amount of private video data becomes considerable. Further, with a service for uploading and mutually viewing video data on the Internet or TV compatible with network, an opportunity for viewing captured and stored video image is increasing.

When the captured video image is viewed, time corresponding to shooting time is required. Then, a user selects video data to be viewed using a cue function referred to as a chapter menu or thumbnail display based on the unit of a file. If the video data contains an unnecessary interval, the user performs fast forward. Since such operation is troublesome, many users edit the video image. The user connects parts (hereinafter, referred to as cuts) having the video data to be viewed in the edition of the video image. As needed, graphic video images are combined to the cut, a video effect called transition is applied to a connection portion between the cuts, or back ground music (BGM) is added, thereby creating the edited video data.

However, the editing of video image requires specialized knowledge for editing or a knowledge about how to use a video editing tool. Thus, the editing of video image is difficult for a general user. Even if the user has a knowledge on editing or the editing tool, such an operation is troublesome that necessary video data is selected from enormous amounts of video data and the cut of the video data is further selected.

Then, as a technique for easily editing a video image, a technique for automatically performing editing of a video image based on a template file is discussed. A material frame to which the video data is inserted, an effect, BGM, and transition are defined in advance in the template file according to a time code. A video editing apparatus analyzes metadata of each material frame of the template file, further analyzes metadata of the video data, and inserts the video data having matching metadata into the material frame of the template file (see U.S. Patent Publication No. 2009/0052734).

Further, a technique is discussed that a scene for capturing an object is automatically extracted and edited by analyzing a motion vector between video frames and determining an area in which motion vectors with the same size in the same direction are concentrated as an object being tracked. The edited video data contains a plurality of scenes. With this technique, not only the scenes are sequentially arranged in the edited order but also the scenes are rearranged based on the importance degree or similar scenes are connected or put together (see U.S. Patent Publication No. 2008/0123966).

Japanese Patent Application Laid-Open No. 2006-139382 discusses a technique that analyzes video data obtained as a search result under an analysis rule corresponding to a search condition, and determines display contents as the search result based on a display rule selected in connection with a display pattern and the analysis result.

However, in the method discussed in U.S. Patent Publication No. 2009/0052734, the video data including the matching metadata is inserted to the material frame of the template file. Therefore, the connection between the inserted video data may be not preferable. For example, a position of an object suddenly may jump between the video data pieces, or the movement direction of the object can be suddenly opposite.

According to the method discussed in U.S. Patent Publication No. 2008/0123966, although similar scenes are connected based on the motion vector, it is not possible to prevent the jumping of the object position between the video data. Even similar scenes do not make sense in the connection, so that an unnatural video image may be generated.

With to the method discussed in Japanese Patent Application Laid-Open No. 2006-139382, although the connection of the video data is considered to make sense with the display pattern, the object position may jump. Since the analysis is performed based on the unit of the video data, the cuts cannot be connected to make sense. For example, a cut of an object over a line-of-sight is connected just after a cut in which the line-of-sight is directed thereto in the video data. The video image having an unnatural connection make a viewer confused, and the viewer cannot understand contents.

SUMMARY OF THE INVENTION

One aspect of the present invention is directed to a technique capable of naturally connecting cuts in an edited video image.

According to an aspect of the present invention, a video editing apparatus capable of generating edited video data includes a video data selection unit configured to select a plurality of pieces of video data based on a set selection condition, an estimation unit configured to estimate correlation between video frames of the plurality of pieces of the video data selected by the video data selection unit, a cut-point setting unit configured to set the video frames estimated with a predetermined high correlation by the estimation unit as a cut-point, if the plurality of pieces of the video data selected by the video data selection unit are connected, and a generation unit configured to connect the plurality of pieces of the video data selected by the video data selection unit based on the cut-point set by the cut-point setting unit, and generate the edited video data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of template information.

FIG. 4 illustrates an example of metadata.

FIGS. 5A and 5B illustrate examples of a playlist.

FIG. 6 illustrates an example of a cut-point selection result.

DESCRIPTION OF THE EMBODIMENTS

Various exemplary embodiments, features, and aspects of the invention will be described in detail below with reference to the drawings.

Figure 1:
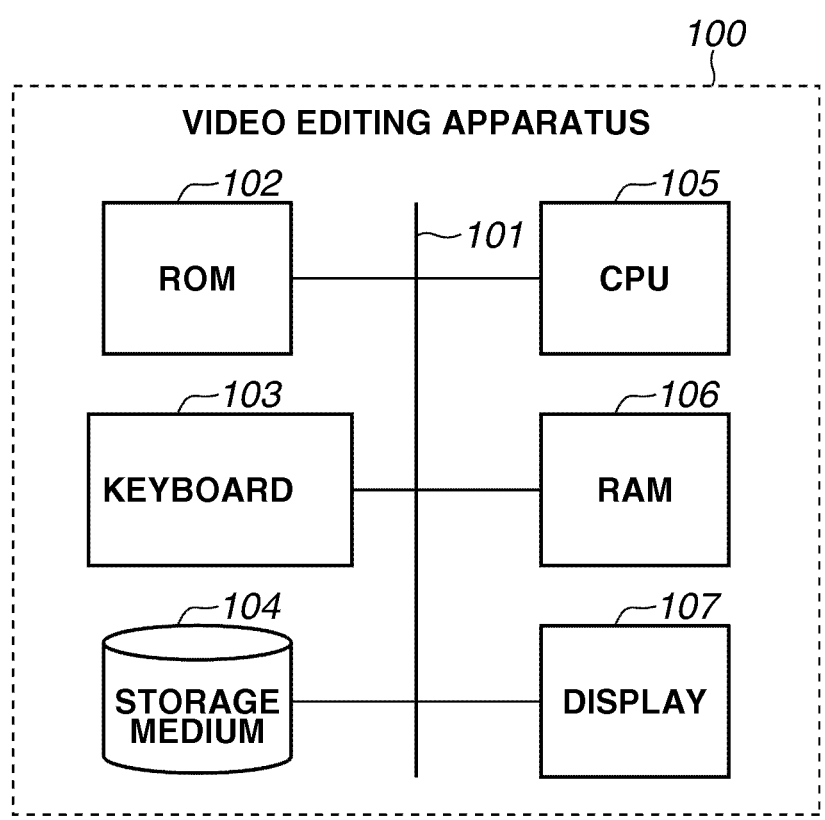
FIG. 1 illustrates an example of a hardware configuration of a video editing apparatus.

FIG. 1 illustrates an example of a hardware configuration of a video editing apparatus according to an exemplary embodiment of the present invention. A video editing apparatus 100 can edit video data stored in a storage medium, and generates the edited video data. The video editing apparatus 100 includes a bus 101, a read only memory (ROM) 102, a keyboard 103, and a storage medium 104. Further, the video editing apparatus 100 includes a central processing unit (CPU) 105, a random access memory (RAM) 106, and a display 107.

The bus 101 is a control module that enables the CPU 105 to read and write data from/to another hardware module. According to the present exemplary embodiment, although all hardware modules are connected to the single bus 101, a plurality of buses may be provided according to a type of the connected modules.

The ROM 102 stores a program for starting the video editing apparatus 100. When the video editing apparatus 100 is turned on, the CPU 105 reads and executes the program stored in the ROM 102 to initialize the hardware modules or to start an operating system (OS).

The keyboard 103 is a general type keyboard, and transmits input of alphabets, numerals, Enter, Back Space, ESC, or TAB to the CPU 105 from a user. The keyboard 103 may be another input device such as a touch panel, a mouse, or a device-specific button.

The storage medium 104 stores various types of data such as video data, edited video data, or a template, which will be described below with reference to FIG. 3. Further, the storage medium 104 stores the OS or a processing program of the functional block in the video editing apparatus 100. More specifically, the storage medium 104 may be a hard disk drive, a solid state disk (SSD), or a compact-disc read-only memory (CD-ROM). The storage medium 104 may be enclosed in a casing of the video editing apparatus 100 or may be connected via a network.

The CPU 105 is an arithmetic unit that executes a start-up program of the video editing apparatus 100, the OS, and the processing program of the functional block.

The RAM 106 is a storage medium that temporarily stores data when the CPU 105 executes various programs. The RAM 106 stores a cut-point selection result or a playlist according to the present exemplary embodiment.

The display 107 displays the video data, the edited video data, and various types of graphical user interfaces. More specifically, the display 107 may be a liquid crystal display, a plasma display, or a cathode ray tube (CRT) display.

The CPU 105 executes the program, thereby realizing the function of the video editing apparatus 100 and processing illustrated in flowcharts, which will be described below. In other words, the storage medium 104 stores the program for realizing the processing illustrated in the flowcharts.

Figure 2:
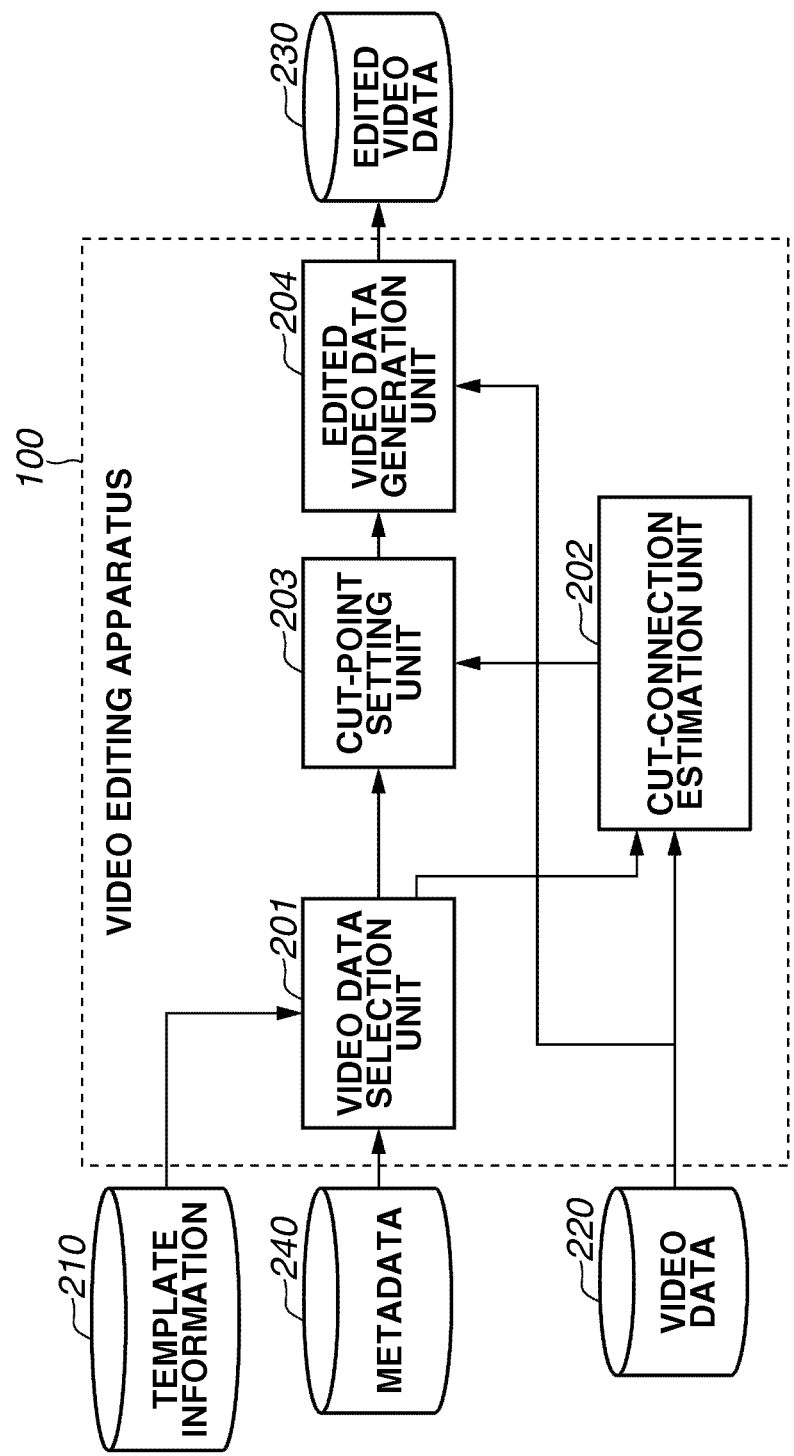
FIG. 2 illustrates an example of a functional configuration of the video editing apparatus.

FIG. 2 illustrates an example of a functional configuration of the video editing apparatus 100. The video editing apparatus 100 includes a video data selection unit 201, a cut-connection estimation unit 202, a cut-point setting unit 203, and an edited video data generation unit 204. Video data 220 includes a plurality of pieces of the video data as an editing target, is divided into individual files in advance based on the unit of shooting with ON/OFF of a video camera, and is stored in the storage medium 104.

Template information 210 includes a condition for selecting the video data 220 according to features of an edited video image to be generated. The template information 210 is stored in the storage medium 104.

FIG. 3 illustrates an example of the template information 210. The template information 210 contains information pieces such as a cut identification (ID) and a selection condition. The cut ID is an identifier for uniquely identifying the cut, and a sequential number is assigned to the cut in appearance order of the cuts. Under the selection condition, the video data is selected corresponding to the cut. The above described configuration and structure of the template information 210 is an example and the present invention is not limited thereto. For example, user addition metadata such as "entry scene" may be described as the selection condition.

Metadata 240 is a metadata table having described information relating to contents of the video data 220, is created in advance prior to video editing processing, and is stored in the storage medium 104.

FIG. 4 illustrates an example of the metadata 240. The metadata 240 include a video data name, a face size, a number of persons, and information added by the user (user addition metadata). The video data name is information capable of uniquely identifying the video data, i.e., a file name. The face size is detected from the video data, and is also information for classifying the data into "large", "medium", and "small". The number of persons is the number of faces detected from the video data and is also information for classifying data into "large", "small", and "1". The user addition information can be arbitrarily set by a user, and indicates a keyword of contents of the video data.

The above described types and values of the metadata are examples and the present invention is not limited thereto. The metadata may be stored as a database instead of a table. The metadata 240 may be created during the video editing processing. Edited video data 230 is the edited video data generated as an edited result, and is stored to the storage medium 104.

The video data selection unit 201 generates a first playlist 900a based on the template information 210 and the metadata 240. FIG. 5A illustrates an example of the first playlist 900a, and the first playlist 900a includes information pieces such as cut ID and a video data name. The cut ID is an identifier for uniquely identifying the cut, and has the same value as that of the cut ID of the template information 210. The video data name is information for uniquely identifying the video data, and is of video data including metadata matching the selection condition described in the template information 210.

The cut-connection estimation unit 202 generates a cut-point selection result 800 from the first playlist 900a and the video data 220.

The cut-point selection result 800 is information describing a combination of video frames with high correlation between two pieces of the adjacent video data in the first playlist 900a, as the cut-point. The combination of the video frames with high correlation is the one with high visual or sensible correlation. The combination of the video frames with high visual correlation is the one with high continuity of movements of the object, high similarity of movement directions of the object, high similarity of positions of the object, and high visual similarity. The combination of the video frames with high sensible correlation is the one in which line-of-sight directions match with.

The cut-connection estimation unit 202 analyzes an image of at least one video frame in the video data 220 and estimates connection between cuts using the metadata provided in advance at an interval of video images. FIG. 6 illustrates an example of the cut-point selection result 800. The cut-point selection result 800 includes a preceding video data name, a following video data name, a cut-point of the preceding video data, and a cut-point of the following video data on a time axis. The cut-point of the preceding video data indicates an out point at an interval of the preceding video data. The cut-point of the following video data indicates an in point at an interval of the following video data.

The cut-point selection result 800 in FIG. 6 indicates that a video frame of the preceding video data "video_1.mpg" at 48.00 second and a video frame of the following video data "video_2.mpg" at 3.13 second are selected as a cut-point of the video data video_1.mpg and the video data video_2.mpg.

According to the present exemplary embodiment, the cut-connection estimation unit 202 generates the cut-point selection result 800 to two pieces of adjacent video data in the video data set to the first playlist 900a. Alternatively, the cut-connection estimation unit 202 may generate the cut-point selection result 800 for all combinations of the video data 220.

The cut-point setting unit 203 generates a second playlist 900b obtained by adding the cut-point to the first playlist 900a based on the cut-point selection result 800. FIG. 5B illustrates the second playlist 900b. The second playlist 900b includes information pieces about the cut ID, the video data name, an "in" point, and an "out" point. The cut ID and the video data name have values similar to those in the first playlist 900a. The in point and the out point are cut-points at which two adjacent video data names in the first playlist 900a match each other with the preceding and following video data names of the cut-point selection result 800.

The edited video data generation unit 204 reads the video data from the video data 220 based on the video data name, the in point, and the out point which are set to the second playlist 900b, connects the read video data, and generates the edited video data 230.

Figure 7A:
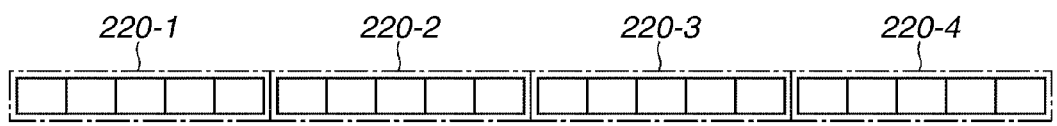
FIGS. 7A to 7C illustrate processing flows.
Figure 7B:
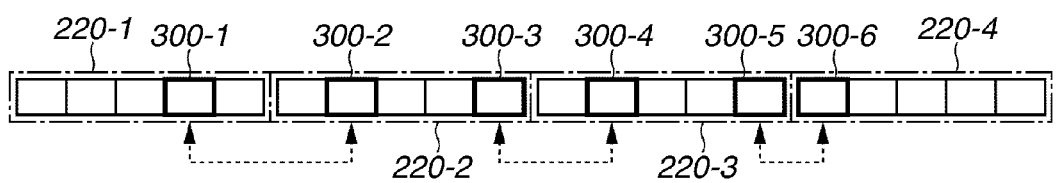
Figure 7C:
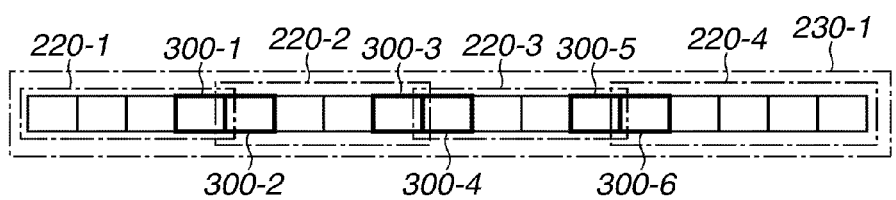

FIGS. 7A to 7C illustrate processing flows according to the present exemplary embodiment. Pieces of video data 220-1, 220-2, 220-3, and 220-4 are editing targets. FIG. 7A illustrates a state in which the video data selection unit 201 selects the video data. FIG. 7B illustrates a state in which the cut-point setting unit 203 sets the cut-point to the adjacent video data pieces (e.g., the video data 220-1 and the video data 220-2) based on the estimation by the cut-connection estimation unit 202. As the cut-point (out point) of the video data 220-1, a video frame 300-1 is selected, and a video frame 300-2 is selected as the cut-point (in point) of the video data 220-2.

FIG. 7C illustrates a state in which edited video data 230-1 is generated based on the cut-point set by the cut-point setting unit 203. For example, the video data 220-1 and the video data 220-2 is connected with the video frame 300-1 and the video frame 300-2. As illustrated in FIGS. 7A to 7C, when connecting two pieces of the video data, the video editing apparatus 100 connects the video frames (e.g., the video frame 300-1 and the video frame 300-2) which are estimated as highly correlated each other, so that a naturally connected edited video image can be generated.

Figure 8A:
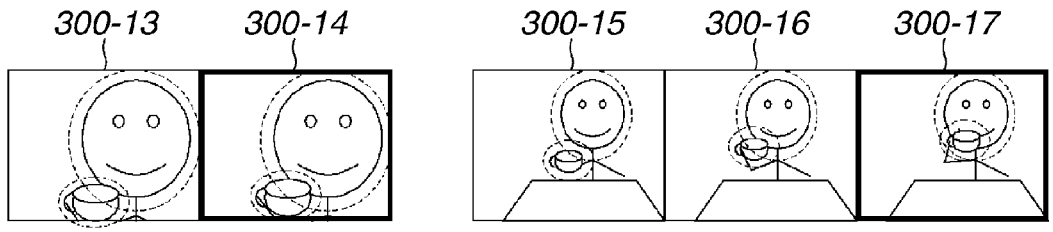
FIGS. 8A to 8E illustrate examples of correlation estimation between video frames.

FIGS. 8A to 8E illustrate examples of correlation estimation between the video frames. FIG. 8A illustrates the correlation estimation based on the continuity of the movement of a single object. Referring to FIG. 8A, a video frame 300-13 and a video frame 300-14 are of the preceding video data. Video frames 300-15 to 300-17 are of the following video data.

When estimating the continuity of the movement, the cut-connection estimation unit 202 first extracts an area including a motion from a motion vector, and determines whether the movement is the similar movement of the same object by matching images in the area with motion with each other. Subsequently, the cut-connection estimation unit 202 estimates whether a change in distance to the object around the motion is continuous between the video frames determined including the similar movement of the same object.

Referring to FIG. 8A, the area with the motion is an area of an image of a cup. The cut-connection estimation unit 202 estimates from the change in distance between the cup and a face or a mouth, that the continuity is high between the video frames 300-14 and 300-17. Further, the cut-connection estimation unit 202 estimates that the video frame 300-16 has high continuity to the video frame 300-13.

Figure 8B:
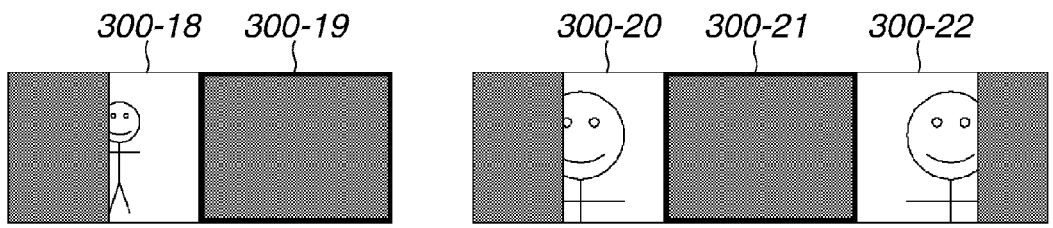

FIG. 8B illustrates an example in which the cut-connection estimation unit 202 estimates the correlation based on the similarity of the video frames. The cut-connection estimation unit 202 compares distributions of color, brightness, and luminance of the image in the video frames to estimate the similarity of the video frames. Referring to FIG. 8B, video frames 300-19 and 300-21 illustrate a state in which a person or a subject cuts across in front of the object, and the video frame is covered with a front scene. The similarity of the distributions of color, brightness, and luminance is high between the video frames 300-19 and 300-21. The cut-connection estimation unit 202 estimates that the video frames 300-19 and 300-21 are video frames with high correlation.

Figure 8C:
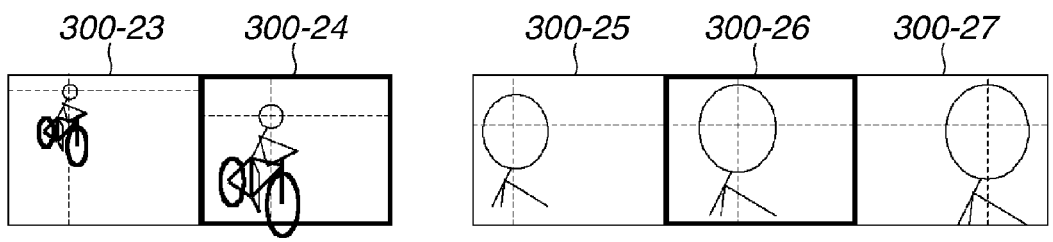

FIG. 8C illustrates an example of estimating the correlation based on the similarity of the positions of the same object. In the example, the cut-connection estimation unit 202 estimates the similarity of the detection positions of the face recognized as the same person as the object positions. Since the similarity of the object positions between video frames 300-24 and 300-26 is high, the cut-connection estimation unit 202 estimates that the video frames 300-24 and 300-26 have high correlation. The cut-connection estimation unit 202 detects the face and recognizes a person with a known method.

Figure 8D:
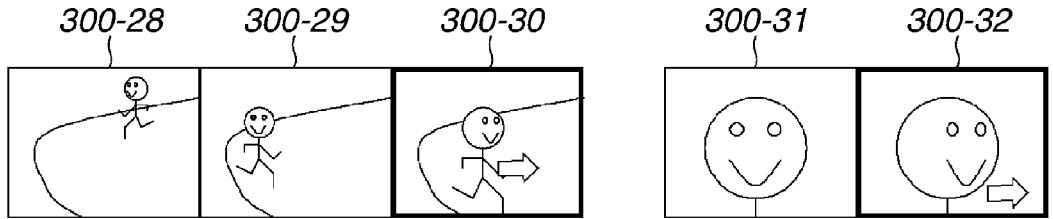

FIG. 8D illustrates an example of estimating the correlation based on the similarity of the movement directions of the same object. The cut-connection estimation unit 202 detects the movement of the same object based on a change in a face detection position of same person, and estimates the similarity of the movement directions. Since the movement directions of video frames 300-30 and 300-32 have high similarity, the cut-connection estimation unit 202 estimates that the video frames 300-30 and 300-32 have high similarity.

Figure 8E:
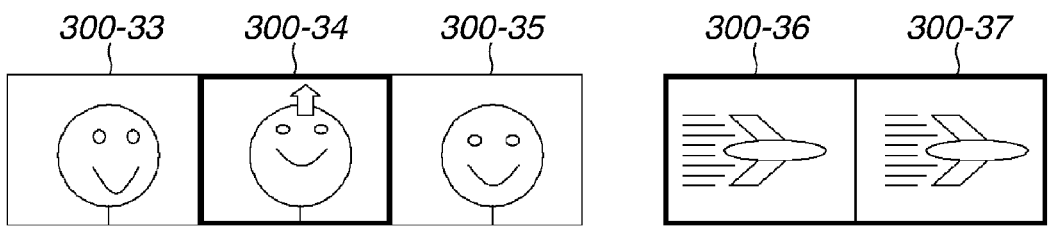

FIG. 8E illustrates an example of estimating the correlation based on the similarity of the line-of-sight directions of the object and the object positions. As a method for detecting the line-of-sight direction of the object, a known method can be applied which is based on detection of a face detection range, portions of facial parts, such as eyes and a mouth, and pupils. The detection of the object direction uses the metadata or the user addition metadata generated from information from an electrical magnet or an inclination sensor which has been mounted in a recent camera. Since the object is in an upward direction in a video frame 300-34, and video frames 300-36, and 300-37 are video images that an air plane flies, the cut-connection estimation unit 202 estimates that the video frames 300-34, 300-36, and 300-37 have high correlation.

Figure 9:
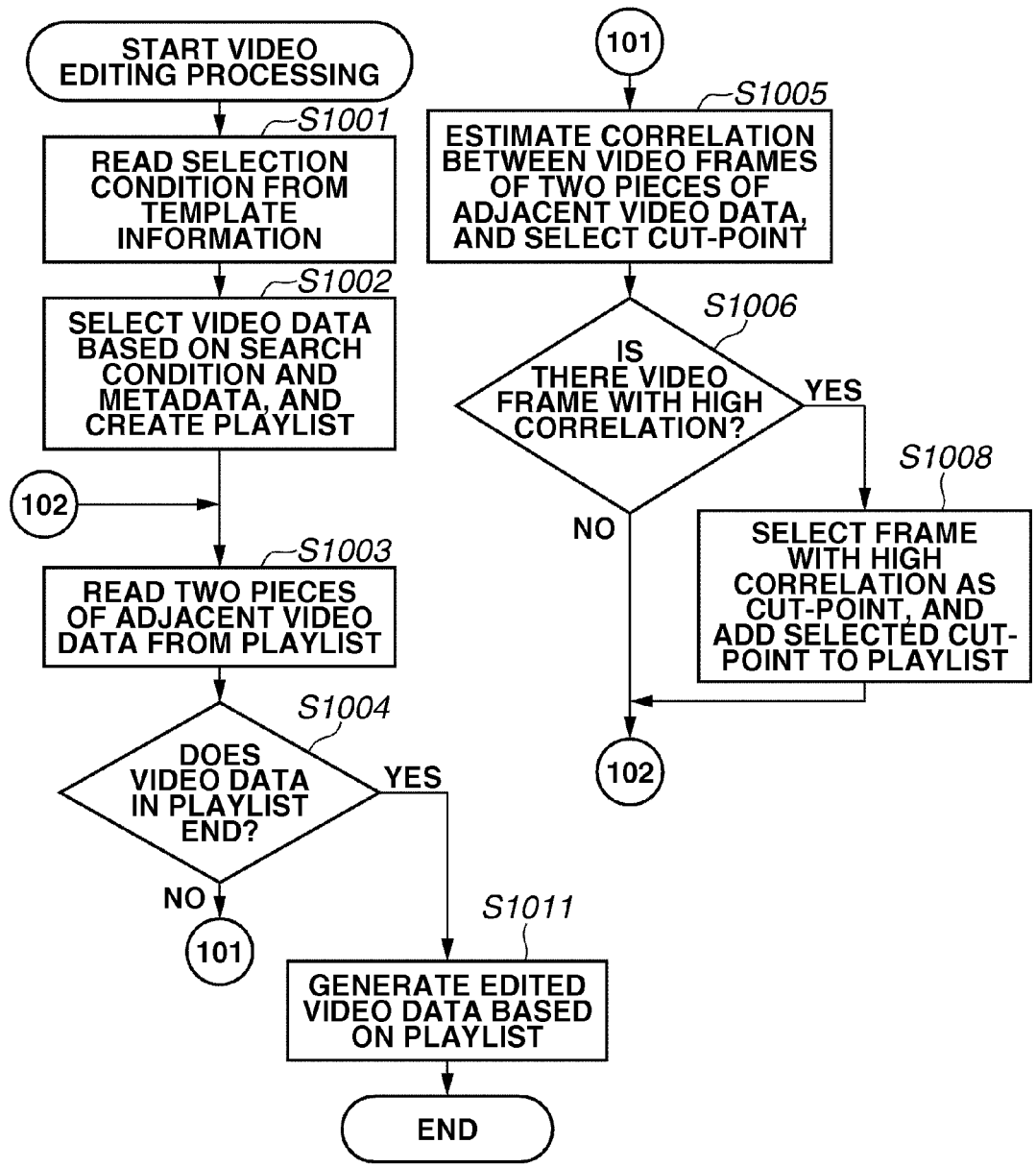
FIG. 9 is a flowchart illustrating an example of video editing processing.

FIG. 9 illustrates an example of the video editing processing. When the video editing processing is started, in step S1001, the video data selection unit 201 reads the selection condition from the template information 210 stored in the storage medium 104. In step S1002, the video data selection unit 201 selects the video data based on the selection condition and the metadata 240, and creates the first playlist 900a. In step S1003, the cut-connection estimation unit 202 reads two pieces of adjacent video data from the first playlist 900a.

When the video data in the first playlist 900a does not end (NO in step S1004), in step S1005, the cut-connection estimation unit 202 estimates the correlation between the video frames, and creates the cut-point selection result 800. The details of selection processing of the cut-point are described below with reference to FIG. 10.

Then in step S1006, it is determined whether there are the video frames with high correlation. If there are the video frames with high correlation (YES in step S1006), then in step S1008, the cut-point setting unit 203 creates the second playlist 900b obtained by adding the video frames with high correlation as the cut-point. Then, processing is repeated from step S1003. When there is no video frames with high correlation (NO in step S1006), the cut-point setting unit 203 repeats the processing from step S1003.

When processing to the video data in the first playlist 900a ends (YES in step S1004), in step S1011, the edited video data generation unit 204 generates the edited video data based on the second playlist 900b, and ends the processing in the flowchart in FIG. 9.

As described above, the video editing apparatus 100 selects the video frames with high correlation as the in-point and the out-point based on the estimation result of the correlation between the video frames in steps S1005 and S1008, and thus can generate an edited video image with high continuity.

According to the present exemplary embodiment, it is described that the video data is selected based on the selection condition described in the template information 210, as an example. Alternatively, the video data selection unit 201 may select the video data based on an operation input by the user. Further, in step S1005, the cut-connection estimation unit 202 selects the cut-point of the two pieces of the adjacent video data in the first playlist 900a. Alternatively, the cut-connection estimation unit 202 may select the cut-point from all combinations of the video data.

In step S1008, the video frames with high correlation are set as the cut-point. When there is a plurality of pairs of the video frames with high correlation, the cut-point setting unit 203 may select an arbitrary pair, or may select a pair which has the highest value (highest correlation) of correlation by quantifying the level of correlation.

Figure 10:
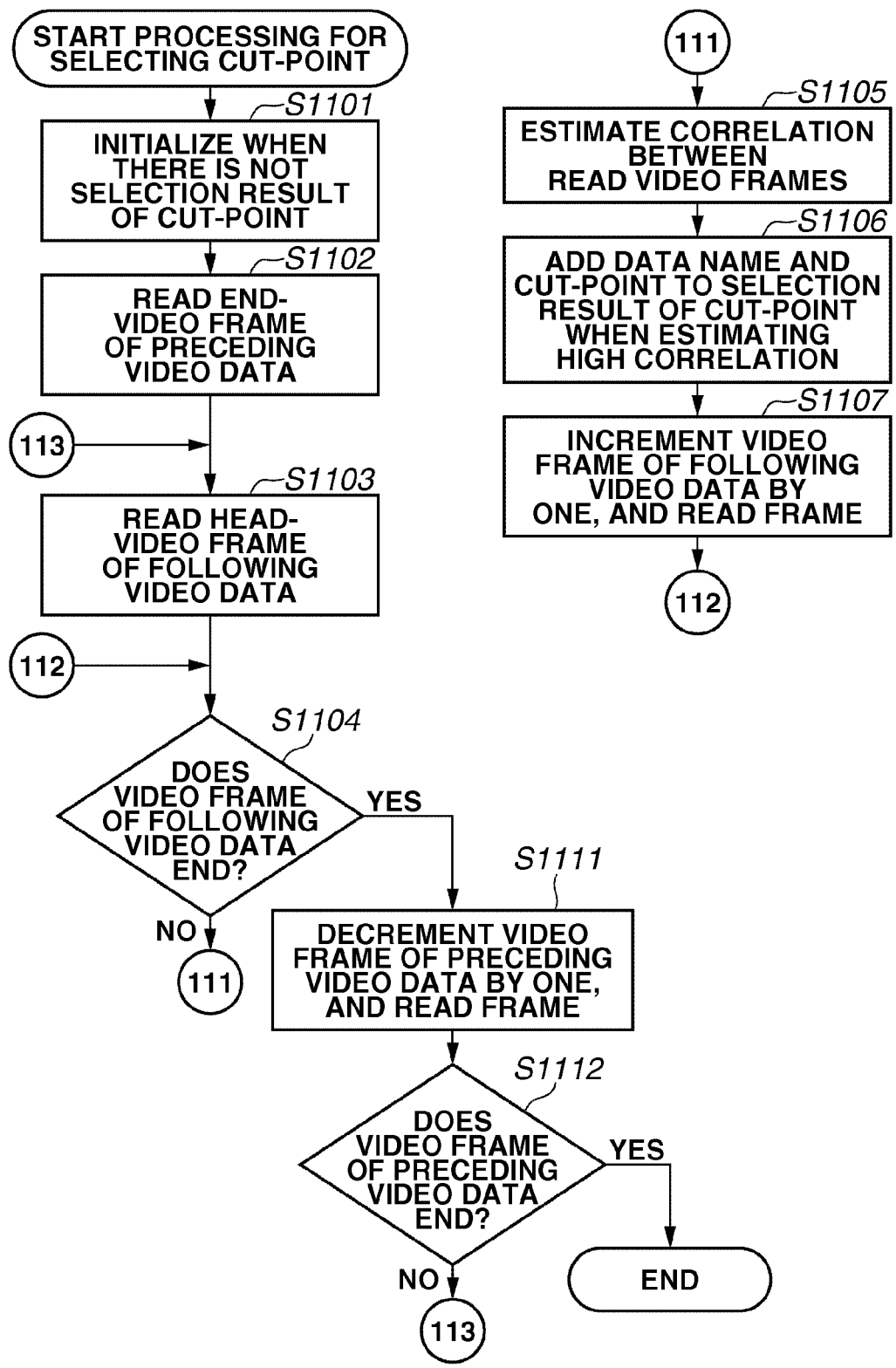
FIG. 10 is a flowchart illustrating an example of selection processing of a cut-point.

FIG. 10 is a flowchart illustrating an example of selection processing of the cut-point. In the selection processing of the cut-point, the cut-point selection result 800 is generated.

When the selection processing of the cut-point is started, if there is no cut-point selection result 800, in step S1101, the cut-connection estimation unit 202 initializes the cut-point selection result 800. In step S1102, the cut-connection estimation unit 202 reads an end video frame in the preceding video data in the video data pieces selected in step S1003. In step S1103, the cut-connection estimation unit 202 reads a head video frame of the following video data.

When the video frame of the following video data does not end, that is, the following video data has not been read to the end thereof (NO in step S1104), in step S1105, the cut-connection estimation unit 202 estimates the correlation between the two video frames read in steps S1102 and S1103. The details of the estimation processing of the correlation are described below with reference to FIG. 11.

When the cut-connection estimation unit 202 estimates that the read two video frames have high correlation in step S1105, in step S1106, the cut-connection estimation unit 202 adds the video data name and the cut-point of the video frames to the cut-point selection result 800. In step S1107, the cut-connection estimation unit 202 increments only one video frame of the following video data and reads the incremented video frame, and repeats the processing from step S1104.

When the video frame of the following video data ends, that is, the reading of the following video data is completed to the end (YES in step S1104), in step S1111, the cut-connection estimation unit 202 increments only one video frame of the preceding video data and reads the incremented video frame.

In step S1112, when the video frame of the preceding video data ends, that is, the reading of the preceding video data is completed (YES in step S1112), the cut-connection estimation unit 202 ends the processing in the flowchart in FIG. 10. When the reading is not completed (NO in step S1112), the cut-connection estimation unit 202 repeats the processing from step S1103.

With the above described processing, the video editing apparatus 100 estimates the correlation between the video frame of the preceding video data and the video frame of the following video data, and can select the video frames with high correlation as the cut-point.

According to the present exemplary embodiment, it is described that the correlation is estimated in all video frames, as an example. The cut-connection estimation unit 202 may perform estimation with respect to the combinations of the video frames within a predetermined range.

Figure 11:
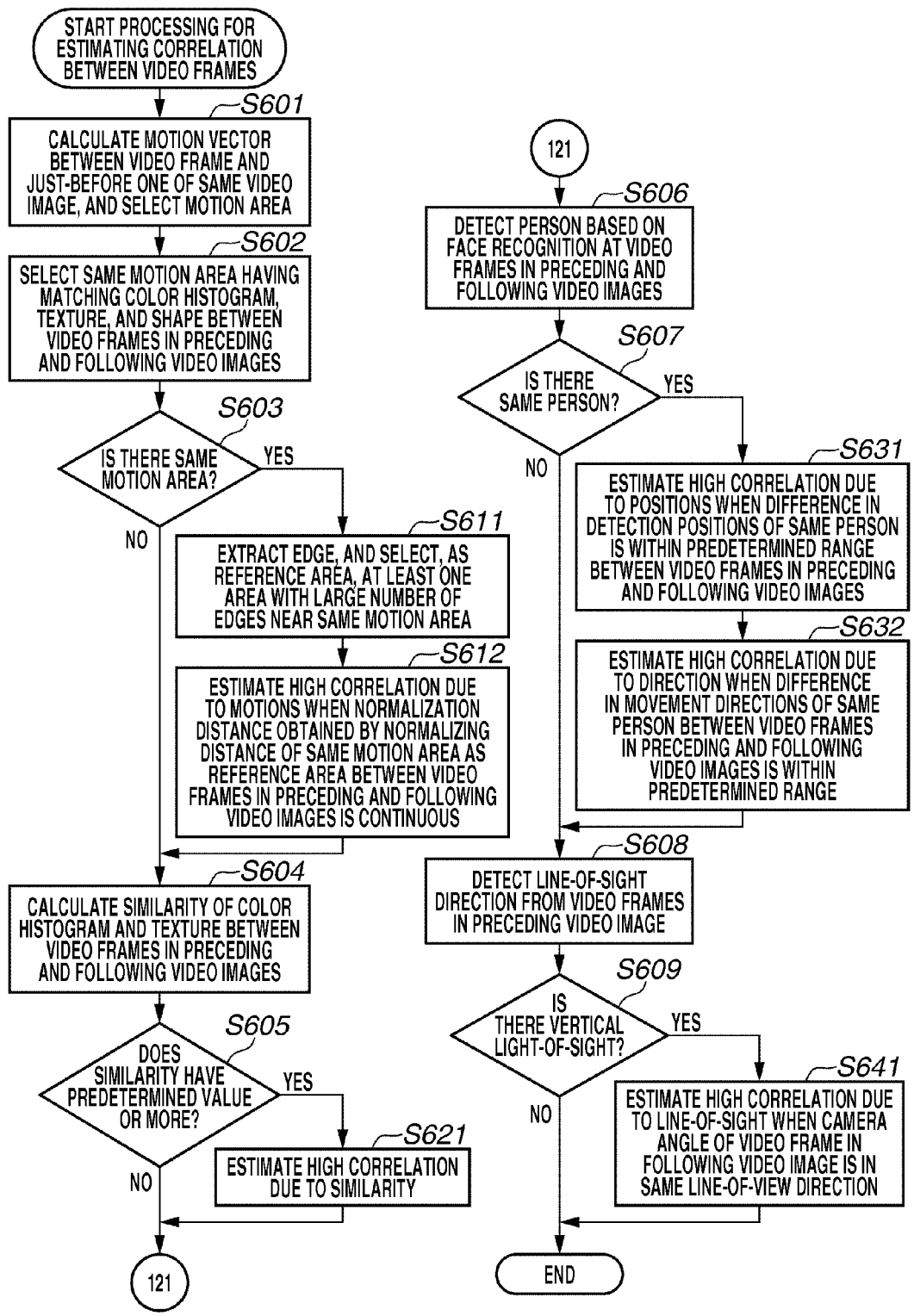
FIG. 11 is a flowchart illustrating an example of correlation estimation processing between video frames.

FIG. 11 is a flowchart illustrating an example of processing for estimating the correlation between the video frames. The processing for estimating the correlation between the video frames is called from step S1105 in FIG. 10. When the processing is started, in step S601, the cut-connection estimation unit 202 calculates motion vectors between a video frame and a one-previous video frame in the preceding video data and in the following video data respectively, and selects areas, in which directions and sizes of the motion vectors are comparable, as motion areas.

Then in step S602, the cut-connection estimation unit 202 selects areas, as the same motion area, in which a color histogram, a texture, and a shape match with each other between the video frames of the preceding and following video data. The color histogram can be obtained by degenerating each of hue, saturation, and brightness to sixteen-dimensional data, for example. The texture can be obtained by performing frequency decomposition on an image using wavelet transformation and acquiring it as a vector. The shape can be obtained by normalizing a distance from a circumscribed circle of the area and acquiring it as histogram.

When there is the same motion area in step S602 (YES in step S603), the cut-connection estimation unit 202 advances the processing to step S611. In step S611, the cut-connection estimation unit 202 extracts an edge every video frame of the preceding and following video data, and selects, as a reference area, at least one area having a large number of edges per unit area near the same motion area and high similarity in edge shape between the video frames of the preceding and following video data.

In step S612, the cut-connection estimation unit 202 estimates that correlation based on the motion is high when the continuity is high in a normalized distance obtained by normalizing a distance from the reference area to the same motion area between the video frames of the preceding and following video data with the area of the reference area. The cut-connection estimation unit 202 determines high continuity of the distance according to high similarity in the normalized distance between one video frame after the video frame of the preceding video data and the video frame of the following video data. The cut-connection estimation unit 202 may determine high continuity of the distance according to the normalized distance between the video frame of the preceding video data and one video frame before the video frame of the following video data.

Subsequent to step S612, or when it is determined that there is no same motion area (NO in step S603), the processing proceeds to step S604. In step S604, the cut-connection estimation unit 202 calculates the similarity of color histogram and texture between the video frames of the preceding and following video data. When the similarity is equal to a predetermined value or more (YES in step S605), in step S621, the cut-connection estimation unit 202 estimates that the video frames of the preceding and following video data have high correlation based on the similarity.

Subsequent to step S621, or when it is determined that the similarity is not equal to the predetermined value or more (NO in step S605), the processing proceeds to step S606. In step S606, the cut-connection estimation unit 202 detects a person with face recognition with respect to the video frame of the preceding and following video data. The cut-connection estimation unit 202 uses a general method for the face recognition.

When there is the same person between the video frames of the preceding and following video data (YES in S607), in step S631, the cut-connection estimation unit 202 estimates that the video frames of the preceding and following video data have high correlation when a difference in detection positions of the same person is within a predetermined range between the video frames of the preceding and following video data.

In step S632, the cut-connection estimation unit 202 estimates that the video frames of the preceding and following video data have high correlation based on the direction if a difference in movement directions of the same person is within a predetermined range between the video frames of the preceding and following video data. The cut-connection estimation unit 202 calculates the movement direction from time variation in the person detection position.

Subsequent to step S632, or when it is determined that there is no same person in the video frames of the preceding and following video data (NO in S607), the processing proceeds to step S608. In step S608, the cut-connection estimation unit 202 detects the line-of-sight direction in the video frame of the preceding video data. The cut-connection estimation unit 202 calculates the line-of-sight direction by mapping a detection result of pupils or eyelids to a three-dimensional (3D) model.

In step S609, if a line-of-sight in the vertical direction is detected (YES in step S609), then in step S641, the cut-connection estimation unit 202 estimates that the video frames of the preceding and following video data have high correlation based on the line-of-sight when a camera angle of the video frame of the following video data is similar to the line-of-sight direction in the video frame of the preceding video data, and ends the processing in the flowchart in FIG. 11. The camera angle can be provided at the shooting time by a triaxial acceleration sensor.

When it is determined that there is no line-of-sight in the vertical direction (NO in step S609), the cut-connection estimation unit 202 ends the processing in the flowchart in FIG. 11.

According to the present exemplary embodiment, a combination of high correlation video frames of two pieces of adjacent video data in the first playlist can be selected as the cut-point.

Through the processing in steps S601 to S607, the video editing apparatus according to the present invention can select, as a cut-point, a combination of video frames with high visual correlation (combination of the video frames with high continuity of the object movement, high similarity in the movement directions of the object, high similarity of the object positions, and high visual similarity).

Further, through the processing in steps S608 to S610, the video editing apparatus according to the present invention can select, as a cut-point, a combination of video frames with high sensible correlation (combination of video frames which match with each other in the line-of-sight direction).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-104185 filed Apr. 28, 2010, which is hereby incorporated by reference herein in its entirety.

What is claimed is:

1. A video editing apparatus for connecting a first part of first video data consisting of a plurality of video frames with a second part of second video data different from the first video data and consisting a plurality of video frames, the video editing apparatus comprising:
a selection unit configured to select a combination of the parts with a high correlation between a last video frame of the first part of the first video data and a first video frame of the second part of the second video data,
wherein the selection unit is configured to select a combination of the parts with a high correlation based on similarity of a line-of-sight direction a first object in a last video frame of the first part of the first video and a second object position indicated by camera direction information of a first video frame of the second part of the second video data; and
a connection unit configured to connect the first part of the first video data with the second part of the second video data selected by the selection unit.

2. The video editing apparatus according to claim 1, wherein the selection unit selects a combination of a last video frame of the first part of the first video and a first video frame of the second part of the second video data, in a case where the line-of-sight direction of the first object in the video frame of the first part of the first video is similar to the direction from the first object to the second object position indicated by camera direction information of a first video frame of the second part of the second video data.

3. The video editing apparatus according to claim 1, wherein the selection unit is further configured to acquire the camera direction information, which is provided at the shooting time of the video frames of the second part of the second video data by a triaxial acceleration sensor.

4. The video editing apparatus according to claim 1, wherein the selection unit is further configured to acquire the line-of-sight direction by mapping a detection result of pupils or eyelids to a three-dimensional model.

5. The video editing apparatus according to claim 1, wherein the selection unit is further configured to acquire the line-of-sight direction by mapping a detection result of pupils or eyelids to a three-dimensional model and acquire the camera direction information provided at the shooting time of the first video frame of the second part of the second video data by a triaxial acceleration sensor.

6. A video editing method for connecting a first part of first video data consisting of a plurality of video frames with a second part of second video data different from the first video data and consisting a plurality of video frames, the video editing method comprising:

selecting a combination of the parts with a high correlation between a last video frame of the first part of the first video data and a first video frame of the second part of the second video data, wherein the selecting step is configured to select a combination of the parts with a high correlation based on similarity of a line-of-sight direction of a first object of a last video frame of the first part of the first video and a second object position indicated by camera direction information of a first video frame of the second part of the second video data; and connecting the first part of the first video data with the second part of the second video data selected by the selecting step.

7. A non-transitory computer-readable storage medium storing a control program, which when loaded into a computer and executed performs a video editing method, the video editing method comprising:

connect a first part of first video data consisting of a plurality of video frames with a second part of second video data different from the first video data and consisting a plurality of video frames;

select a combination of the parts with a high correlation between a last video frame of the first part of the first video data and a first video frame of the second part of the second video data, based on similarity of a line-of-sight direction of a first object of a last video frame of the first part of the first video and a second object position indicated by camera direction information of a first video frame of the second part of the second video data; and connect the first part of the first video data with the second part of the second video data selected by the selection unit.

* * * * *